United States Patent [19]

Ziegler et al.

[11] Patent Number: 4,750,549
[45] Date of Patent: Jun. 14, 1988

[54] RADIATOR GRILLE COVER WITH ADJUSTABLE CENTER OPENINGS

[75] Inventors: John H. Ziegler, Longmont; John A. Daniels, Arvada, both of Colo.

[73] Assignee: Autotron Products, Inc., Longmont, Colo.

[21] Appl. No.: 871,902

[22] Filed: Jun. 9, 1986

[51] Int. Cl.⁴ .............................................. F01P 7/10
[52] U.S. Cl. ..................................... 165/98; 180/68.1; 180/68.4; 180/68.6; 160/DIG. 1; 160/370.2
[58] Field of Search ............................. 165/98, 99, 41; 180/68.1, 68.4, 68.6; 160/DIG. 1, 116, 180, 186, 327, 354, 368 S

[56] References Cited

U.S. PATENT DOCUMENTS

| | | |
|---|---|---|
| 901,616 | 10/1908 | Hobbs . |
| 1,218,039 | 3/1917 | Anderson ...................... 160/DIG. 1 |
| 1,227,181 | 5/1917 | Nathan ................................. 165/98 |
| 1,295,629 | 2/1919 | Stewart ................................ 165/98 |
| 1,407,216 | 6/1920 | Potter . |
| 1,453,340 | 5/1923 | Druar ................................... 165/98 |
| 1,484,199 | 2/1924 | Tyson .................................. 165/98 |
| 1,492,897 | 5/1924 | Ryder .................................. 165/99 |
| 1,602,801 | 10/1926 | Walker . |
| 2,020,838 | 8/1935 | Kaemmer . |
| 2,053,576 | 9/1936 | Osten . |
| 2,068,506 | 1/1937 | Morrison ............................. 165/41 |
| 2,070,919 | 9/1937 | Posey . |
| 2,131,874 | 10/1938 | Griffin ................................. 165/98 |
| 2,155,439 | 4/1939 | Morrison . |
| 4,236,592 | 12/1980 | Ziegler . |
| 4,523,657 | 6/1985 | Kooyumjian . |

FOREIGN PATENT DOCUMENTS

| | | | |
|---|---|---|---|
| 285616 | 2/1928 | United Kingdom | 165/98 |
| 296511 | 9/1928 | United Kingdom | 165/98 |
| 345819 | 4/1931 | United Kingdom | 165/98 |
| 404700 | 1/1934 | United Kingdom | 165/98 |
| 419078 | 11/1934 | United Kingdom | 165/98 |
| 429371 | 5/1935 | United Kingdom | 165/98 |

Primary Examiner—Albert W. Davis, Jr.
Assistant Examiner—John K. Ford
Attorney, Agent, or Firm—John E. Reilly

[57] ABSTRACT

A radiator grille cover for motor vehicles comprises a base panel composed of a flexible material and has suitable fasteners on the base panel for releasable connection to the radiator grille of a motor vehicle. The base panel has a centrally located air-receiving opening with one or more additional panels superimposed thereon which are sized to at least partially cover the opening in the base panel. The additional panels are in the form of flexible flaps with a center opening of a different size, the opening being symmetrical with respect to air passage through the radiator grille and having fasteners for releasably fastening the additional panels to the base panel. One or more of the flaps may be released from a position overlying the center opening of the base panel and inserted into a storage pocket on the front thereof so as not to require complete removal from the grille.

12 Claims, 2 Drawing Sheets

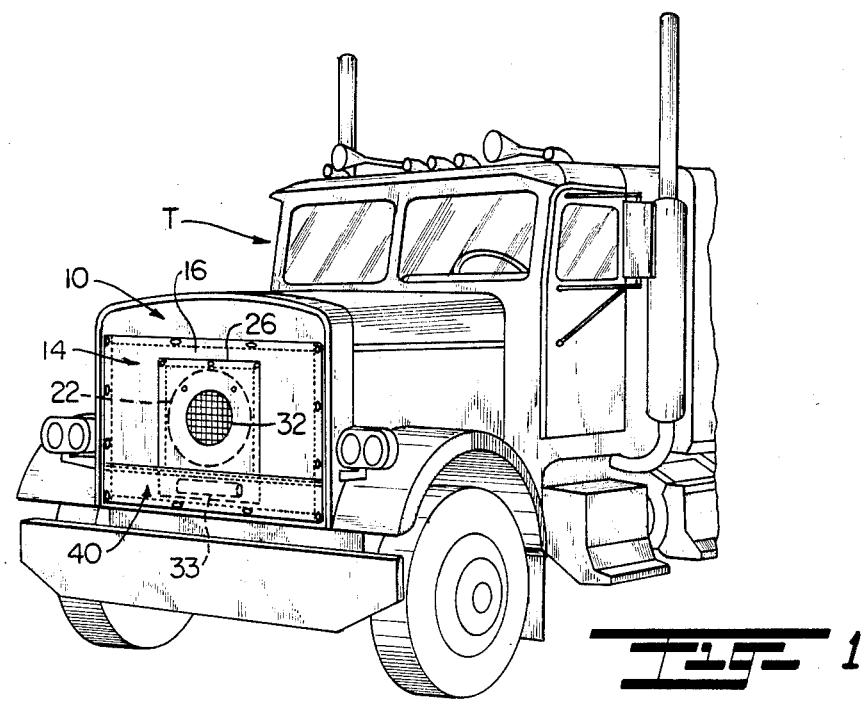
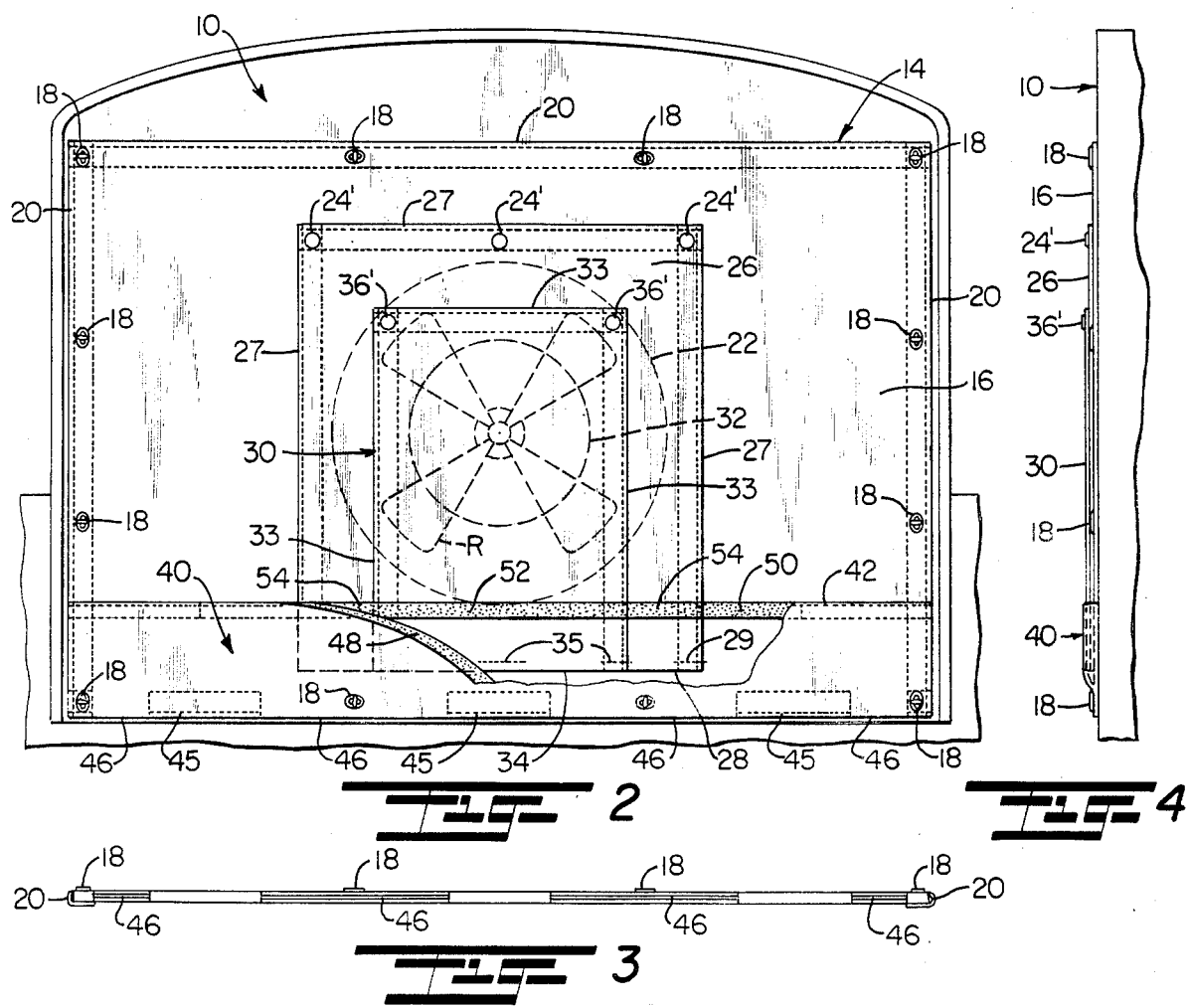

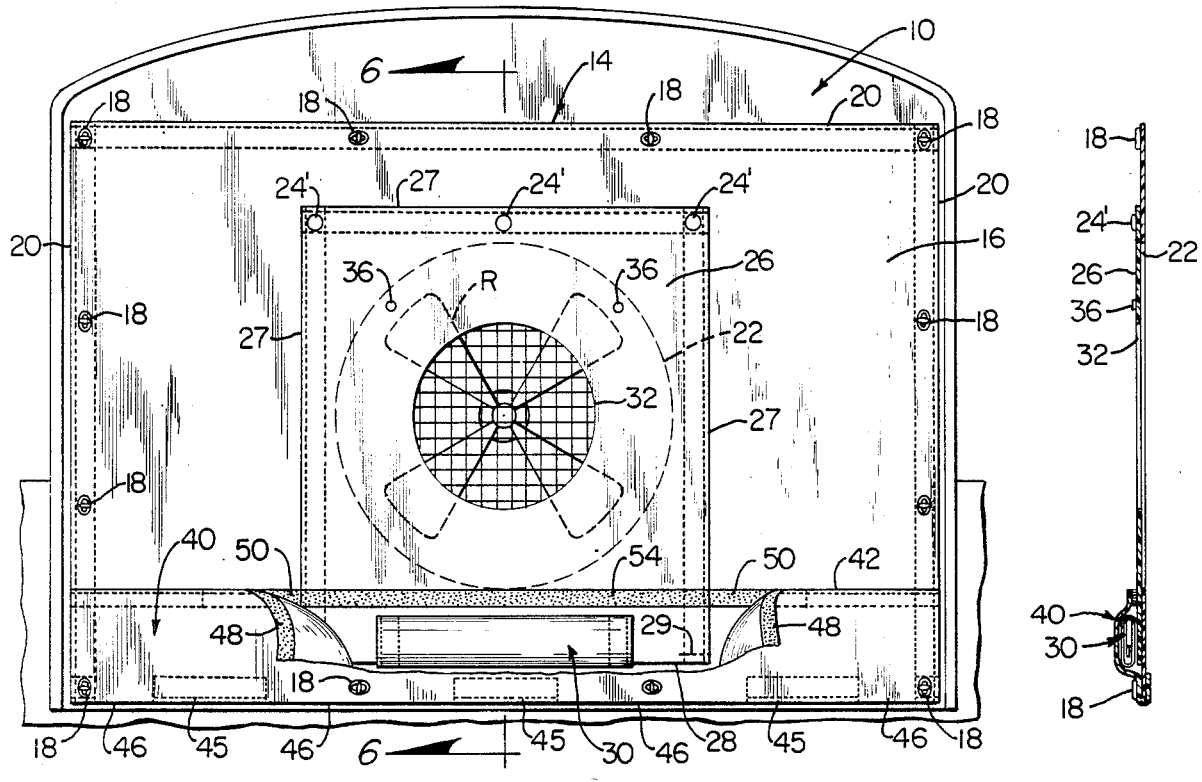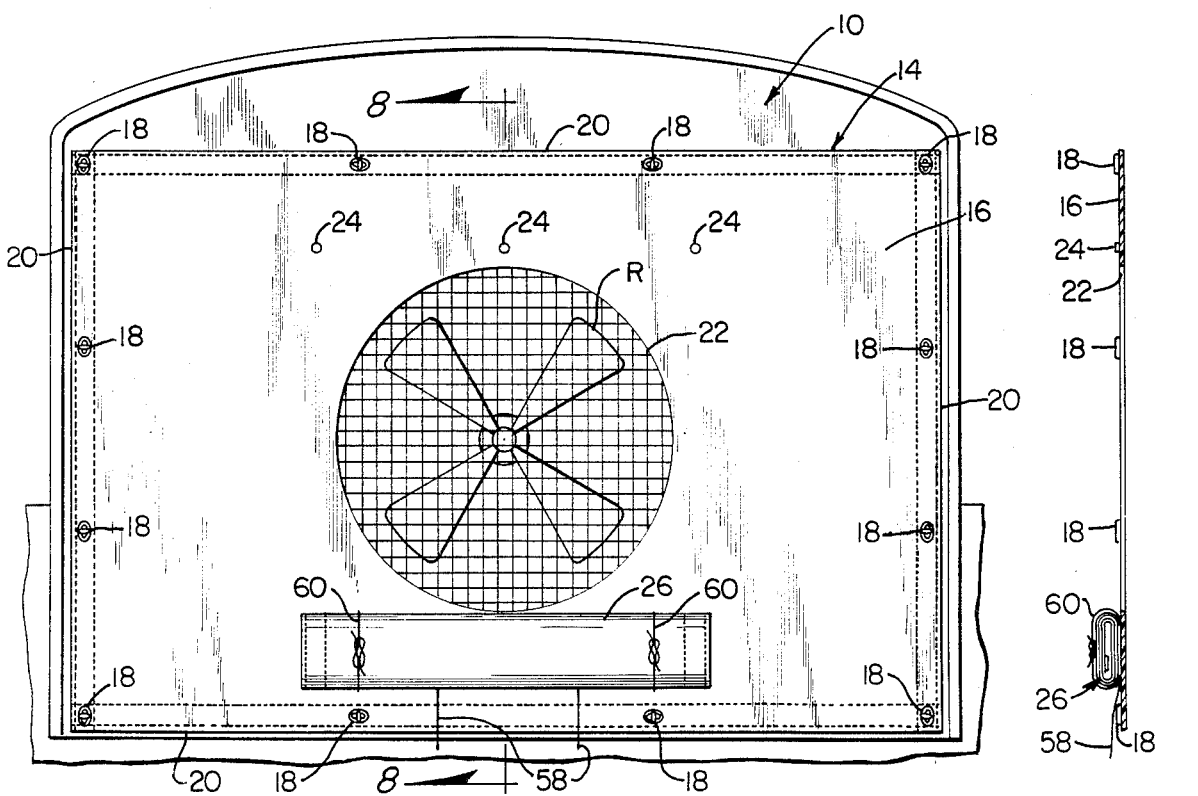

RADIATOR GRILLE COVER WITH ADJUSTABLE CENTER OPENINGS

This invention relates to grille covers for automotive vehicles; and more particularly relates to a novel and improved grille cover with adjustable center openings, the cover being detachably connectable to the radiator grille of a motor vehicle whereby to modulate the cooling action of the radiator on the vehicle engine at low temperatures.

BACKGROUND AND FIELD OF THE INVENTION

It is customary to provide a radiator grille cover to lessen the cooling action of a radiator in the winter. These grille covers, commonly referred to as "winterfronts", are broadly characterized by being connected to the front or exterior surface of the grille and are made up of one or more adjustable flaps secured in place by snap fasteners so as to enable the flap or flaps to be opened by varying degrees in order to control the effective opening size for the passage of air through the radiator grille according to the temperature level. For example, U.S. Pat. No. 1,602,801 to W. D. Walker discloses such a radiator cover in which the opening size is adjustably controlled by a combination of snap fasteners and slide-type fasteners. In U.S. Pat. No. 2,020,838 to H. E. Kaemmer, a grille cover is composed of fabric material and has a plurality of flaps which can be folded away from respective openings to control the total opening size through the cover. A similar approach is taken in U.S. Pat. No. 2,070,919 to J. P. Posey but again relies upon flap sections which can be folded or doubled back upon themselves to adjust the effective opening size.

In U.S. Pat. No. 1,407,216 to L. D. Potter, an adjustable center opening is formed by an iris-type closure being controlled in size by a pinion which intermeshingly engages with a curved rack and operated to cause swinging movement of the segments making up the adjustable closure. In U.S. Pat. No. 4,236,592 to J. H. Ziegler and assigned to the assignee of the instant invention, a winterfront is used in combination with an air deflector and includes flaps which can be doubled upon themselves to adjust the effective opening size for passage of air through the grille into the radiator and engine section of the automobile. In U.S. Pat. No. 4,523,657 to T. A. Kooyumjian, a plurality of flap sections are arranged in quadrants with the common central portion formed between the flap sections defining an opening for the admission of air into the radiator section and which opening size can be regulated by folding the quadrants away from the center opening.

The use of flat panel sections with flap sections as disclosed in the patent to Kooyumjian is desirable from the standpoint of simplicity of construction and reduced size. However, when the opening size is regulated by the degree of fold or doubling over of the flap sections upon themselves, the flap sections are subject to being accidentally released and may interrupt the movement of any substantial amount of air through the center opening. Thus, it is important that the flap sections surrounding the opening be adjustable in such a way as to be either completely removed or foldable into a position in which they are not exposed and cannot be accidentally released.

SUMMARY OF THE INVENTION

Accordingly, it is an object of the present invention to provide for a novel and improved radiator grille cover characterized by having adjustable center opening sizes to regulate the direction and amount of air permitted to pass through the radiator grille.

Another object of the present invention is to provide for a novel and improved winterfront for motor vehicle radiator grilles which is compact, readily adjustable to different center opening sizes to control the cooling action of the radiator; and further, wherein the adjustable portions of the winterfront are not subject to accidental loosening or release.

It is a further object of the present invention to provide for a novel and improved panel-type winterfront having flap sections with different preselected center opening sizes which are conveniently releasable into a stored position on the winterfront without complete removal therefrom in regulating the effective opening size through a radiator grille on a motor vehicle.

In accordance with the present invention, there has been devised a radiator grille cover for motor vehicles which comprises a base panel composed of a flexible material and having suitable fastening means on the base panel for connection to the radiator grille of a motor vehicle, the base panel having a centrally located air-receiving opening therein, and one or more additional panels are superimposed on the base panel and are sized to at least partially cover the opening in the base panel. One or more of the additional panels is provided with a centrally located air-receiving opening therein smaller than the opening in the base panel, and fastening means are provided for releasably connecting each additional panel to the base panel. In a preferred embodiment, the additional panels are in the form of flexible flap sections, at least one of the flap sections having a center opening therein of a different size and each opening being symmetrical with respect to air passage through the radiator grille. One or more of the flap sections may be released from a position overlying the center opening of the base panel and conveniently inserted into a storage pocket on the front of the base panel so a not to require complete removal from the grille.

The above and other objects of the present invention will become more readily appreciated and understood from a consideration of the following detailed description of a preferred embodiment when taken together with the accompanying drawings wherein:

BRIEF DESCRIPTION OF THE DRAWINGS

FIG. 1 is a fragmentary perspective view of a truck illustrating the preferred form of winterfront in attached position to the radiator grille;

FIG. 2 is an enlarged front elevational view of the preferred form of winterfront in attached position to a radiator grille with a lower portion thereof being broken away;

FIG. 3 is a bottom plan view of the winterfront shown in FIG. 2;

FIG. 4 is a side view of the winterfront shown in FIG. 2;

FIG. 5 is another enlarged front elevational view of the preferred form of winterfront with one of the panels of the winterfront in a stored position;

FIG. 6 is a side view of the winterfront in the position illustrated in FIG. 5;

FIG. 7 is a front elevational view of a modified form of winterfront illustrating a pair of panels in a stored position to increase the center opening size through the radiator grille; and FIG. 8 is a side view of the winterfront as shown in FIG. 7.

DETAILED DESCRIPTION OF THE PREFERRED EMBODIMENT

As a setting for the present invention, a truck T is illustrated in FIG. 1 having a front vertical grille section 10 which permits air to be drawn through the radiator section represented at R into the engine compartment area of the truck in a conventional manner. The foregoing is merely representative of various types of motor vehicles which may accommodate the grille cover of the present invention and therefore is given for the purpose of illustration and not limitation.

In accordance with the present invention and referring to FIGS. 2 to 6, a grille cover or winterfront 14 has a plurality of superimposed panels including a rectangular base panel 16 which covers substantially the entire open area of the grille as shown and is connected to the grille by suitable fasteners 18 in the form of grommets. The fasteners or grommets 18 are affixed at spaced intervals around the sides, top and bottom of the grille so as to substantially cover the grille area.

Preferably, the base panel 16 is composed of a heavy-duty flexible vinyl material although it is apparent that other plastic or fabric materials may be employed. The material should be impervious to the passage of water or air and has outer reinforcing strips 20 extending around the four peripheral edges of the panel 16 as shown. An enlarged center opening 22 is of generally circular configuration and symmetrically formed within the base panel 16 with respect to the center of the grille 10. A plurality of snap fastener elements 24 are positioned at spaced intervals on the front exposed surface of the base panel 16 outwardly of and above the center opening 22. In order to accommodate a second panel of rectangular configuration, the fastener elements 24 are disposed at spaced-apart points above the center opening 22, and the outer of the fasteners are alignable with upper corners of the next or second panel 26.

The second panel 26 is superimposed over the center opening 22 and includes outer reinforcing strips 27 with its lower marginal edge 28 preferably being permanently secured to the base panel beneath the center opening 22 by suitable stitching 29 or other means of permanent attachment. The upper corners 30 of the panel include complementary snap fastener elements 24' for releasable attachment to the fastener elements 24 above the center opening. The second panel is composed of a material corresponding to that of the base panel and, when the upper snap fasteners 24' are released, will permit the panel 26 to be rolled or folded downwardly away from the center opening 22, in the manner illustrated in FIGS. 5 and 6. As noted, the second panel is of reduced size with respect to the first panel and symmetrically positioned with respect to the center opening 22 so that when in the closed position it will completely cover the opening. The second panel has a center opening 32 symmetrically formed therein and which is also symmetrical with respect to the center opening 22, and a pair of snap fasteners 36 are positioned outwardly of and above the opening 32.

In a manner corresponding to that described with reference to the second panel, a third panel 30 is superimposed over the center opening 32 having outer reinforcing strips 33 and a lower marginal edge 34 permanently secured by stitching 35. Upper complementary snap fasteners 36' serve to releasably secure the upper corners of the panel to the fasteners 36 on the front exposed surface of the second panel, as shown in FIG. 2.

Most desirably, the base panel 16 includes a lower pocket 40 traversing the lower extension of the panel beneath the center opening 22, the pocket having an upper edge 42 which overlies the lower marginal extents 28 and 34 of the second and third panels. The front of the pocket has its lower edge secured to the surface of the base panel by lower marginal stitching at intermittent or spaced intervals as represented at 45 along the lower extremity. In this way, drain openings 46 are formed between the front surface of the pocket and the base panel to permit any water to pass through the pocket area. The upper edge is releasably secured to the base panel by means of a suitable fastener, such as, a Velcro strip 48 extending its entire horizontal extent. A complementary Velcro strip 50 extends along the lower portion of the base panel 16. Second and third Velcro strips 52 and 54 extend across the front surfaces of the second and third flap sections 26 and 30, respectively for attachment to strip 48 depending upon the number of flaps in the stored position. In this way, either the third panel or the second and third panels may be stored within the pocket when not in use, and the strip 48 secured to the panel strip left exposed. Specifically, if desired to increase the opening size through the grille cover to expose the center opening 22, it is necessary merely to unsnap the second panel 26 at the upper corner points 24 and to roll or fold the second and third panels downwardly away from the center opening until fully housed within the pocket. The pocket 40 is then resealed to retain the flaps or panels in a convenient out-of-the-way storage position when not in use. If desired merely to increase the opening size to that of the center opening 32 in the second panel 26, the third panel is unsnapped in the same manner as described with respect to the second panel and rolled away from the opening 32 into a storage position within the pocket, as best seen from FIGS. 5 and 6.

It will be apparent that the panels may be of various different configurations and that the relative length and width of each panel may be varied in accordance with the model or type of motor vehicle grille. Correspondingly, the center openings may be of different configurations, such as, circular, oval or rectangular and may be of different relative sizes according to the adjustability desired in controlling the air passage through the grille. Similarly, the number of flaps or panels employed may vary according to the adjustability desired in the effective opening size.

DETAILED DESCRIPTION OF MODIFIED FORM OF INVENTION

A modified form of invention is illustrated in FIGS. 7 and 8 wherein like parts to those of FIGS. 1 to 6 are correspondingly enumerated. Instead of a pocket area 40, the panel or flap sections 26 and 30 are mounted and secured to the base panel 16 as in the preferred form, and two sets of drawstrings 58 and 60 are provided for storage of the flap sections. Each set 58 and 60 comprises a pair of drawstrings at opposite ends of one of the flap sections 26 and 30. Thus, when the third panel 30 is rolled up it is secured in place by tying the drawstrings 58 around the panel 30; or, as shown in FIGS. 7 and 8, when the second and third panels are folded or rolled up, they are secured by the drawstrings 60.

The modified form possesses the advantage of simplicity in construction but leaves the flaps exposed to the elements and presents somewhat more of an obstruction than the use of a pocket 40 when the flaps are in the folded or rolled position.

Although the present invention has been described with particularity relative to the foregoing detailed description of the preferred and modified embodiments, various modifications, changes, additions and applications other than those specifically mentioned herein will be readily apparent to those having normal skill in the art without departing from the spirit and scope of this invention as defined by the appended claims.

We claim:

1. A radiator grille cover for controlling the effective opening size of a radiator grille on a motor vehicle comprising in combination:
   a base panel composed of a material impervious to air and water and including fastening means on said base panel for connection to said grille, said panel having an air-receiving opening therein; and
   a flexible panel superimposed on said base panel having an outer peripheral edge and sized to at least cover said opening in said base panel, said flexible panel including first connecting means for connecting a portion of said peripheral edge to said base panel and second connecting means releasably connecting said flexible panel to said base panel at a location(s) spaced from said first connecting means whereby upon release of said second connecting means said flexible panel is movable to a position exposing said air-receiving opening in said base panel; and
   a plurality of additional panels, each said additional panel provided with an opening substantially aligned with the opening in said base panel in their superimposed positions, said additional panels being superimposed upon one another, and said flexible panel next adjacent to said base panel having a smaller air-receiving opening therein than the opening in said base panel.

2. A radiator grille cover according to claim 1, each said additional panel having opposite end portions, one of said end portions being releasably connected to the next adjacent panel beneath it and an opposite end portion on each additional panel permanently connected to each next adjacent panel beneath it.

3. A radiator grille cover according to claim 2, said base panel including a pocket disposed in its exterior surface beyond said opposite end portion of said additional panels, one or more of said additional panels being releasable from said next adjacent panel and insertable into said pocket to expose the opening in the next adjacent panel.

4. A radiator grille cover according to claim 3, said pocket provided with drain openings therein.

5. A radiator grille cover according to claim 3, said pocket including a removable closure along one end.

6. A radiator grille cover according to claim 1, said base panel and each additional panel being composed of a flexible vinyl material.

7. A radiator grille cover according to claim 1, said base panel provided with fasteners at spaced intervals connected to said grille, said base panel dimensioned to substantially cover said grille.

8. A radiator grille cover for covering the effective air opening size in a radiator grille of a motor vehicle, said cover comprising a flexible base panel including fastening means for connection to the exterior surface of said grille in symmetrical relation to the center opening of said grille, said flexible base panel provided with an opening therein which is symmetrical with respect to the center of said grille, at least one flap section superimposed on said base panel and sized to cover the opening in said base panel, said flap section adjacent to said base panel provided with an opening therein smaller than and substantially aligned with the opening in said base panel when in their superimposed positions, and means releasably connecting one end of each said flap section to the next adjacent underlying panel.

9. A radiator grille cover according to claim 8, there being a plurality of additional flap sections, said additional flap sections superimposed upon one another, at least one additional flap section in succession away from said base panel having a progressively smaller opening therein, and the outermost of said flap section fully covering the opening in the next adjacent underlying panel.

10. A radiator grille cover according to claim 9, each said flap section having opposite end portions, one of said end portions being releasably connected to said base panel or next adjacent panel and the other of said end portions being permanently connected to said base panel or each next adjacent panel.

11. A radiator grille cover according to claim 10, including means for releasably securing each said flap section in a storage position whereby to expose the opening in the next adjacent flap section or base panel.

12. A radiator grille cover according to claim 11, said releasable securing means defined by string ties securable in surrounding relation to each flap section.

* * * * *